Oct. 18, 1932.   H. D. ADAMS   1,883,437
AUTOMOBILE ACCELERATOR PEDAL
Filed Dec. 11, 1930
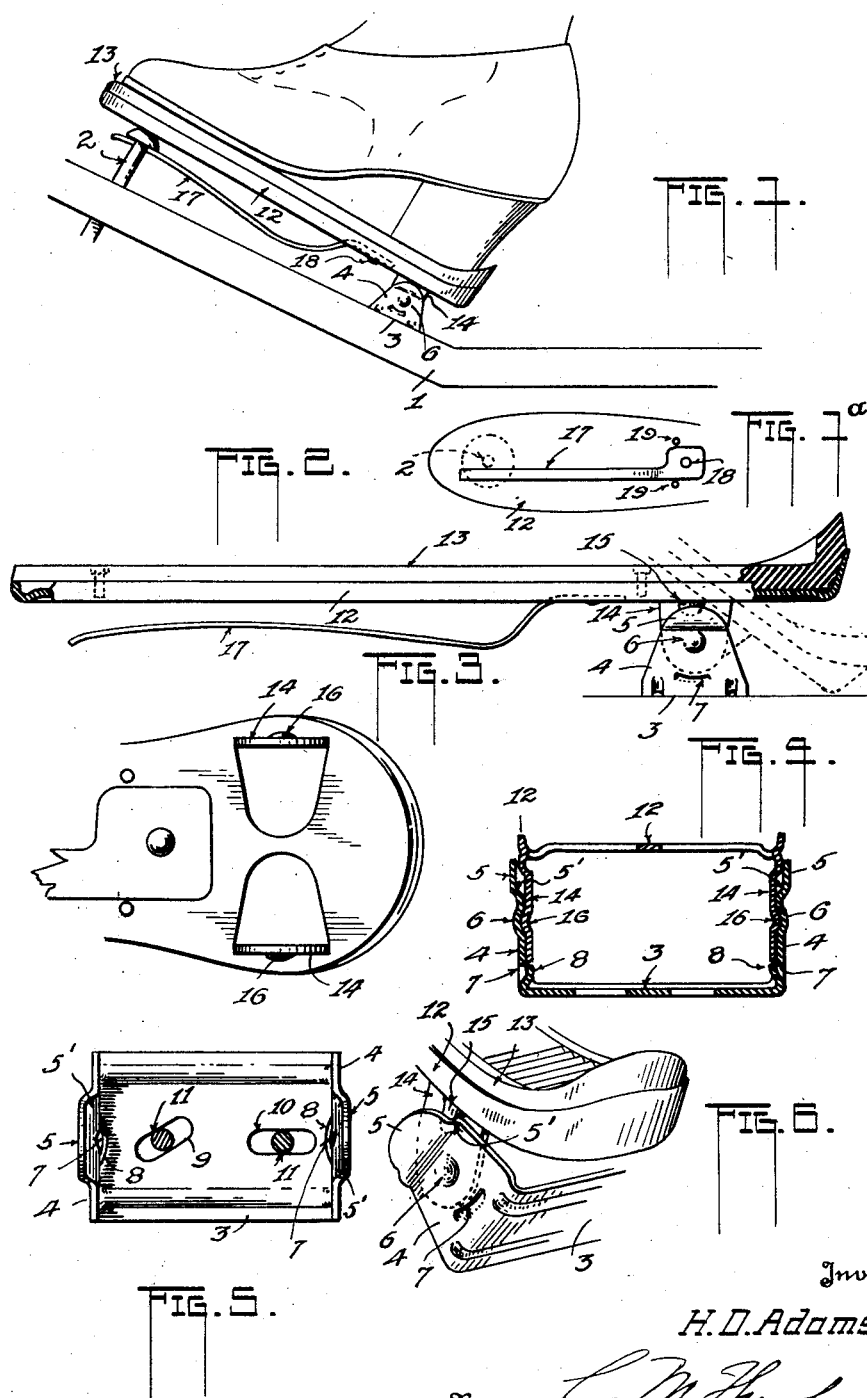

Patented Oct. 18, 1932

1,883,437

UNITED STATES PATENT OFFICE

HALE D. ADAMS, OF GALESBURG, ILLINOIS

AUTOMOBILE ACCELERATOR PEDAL

Application filed December 11, 1930. Serial No. 501,523.

This invention relates to automobile accelerator pedals, being directed particularly to a mounting for a pedal, and the mounting itself.

The main object of the invention is to provide a mounting to which an accelerator operating pedal can be readily attached and from which it can be detached without requiring the use of separate means for pivotally connecting the two parts.

Another object is to provide a pivotal connection between a floor-board mounting and a pedal so arranged as to be positively held in connected pivotal relation by friction but such as will permit easy and ready separation.

A further object is to furnish a mounting for attachment to the floor-board of an automobile and to provide a pedal portion for connection therewith, one or both of the portions being flexible and adapted by means of a frictionally engaging ball-and-socket arrangement to hold the two in secure pivotal relation while permitting easy separation.

Again, an object is the provision of a pedal mounting and a pedal pivoted in such manner that the two may be separated by a pull, and to include provision for assisting in accomplishing separation in an easy manner.

Another object is the provision of a pedal-mounting so appointed as to permit its free angular adjustment on the floor-board. Further, an object lies in providing the under side of a pedal with means to engage beneath the starter-button for the purpose of holding the pedal to the button, or other type of accelerator portion whereby to prevent rattling, and preventing the pedal leaving the button.

That my invention may be readily and clearly understood I have provided the appended drawing forming part hereof wherein Figure 1 is a side elevation of the pedal for operating the accelerator button of an automobile showing my invention in connection therewith.

Figure 1ª is a plan of the under side of the pedal produced on a smaller scale.

Figure 2 is a side elevation of the pedal on a larger scale, parts thereof being shown in section.

Figure 3 is a plan of the under side of a pedal according to my invention.

Figure 4 is a transverse sectional elevation of a pedal and mounting involving the invention.

Figure 5 is a plan of the mounting shown in Figures 1, 2 and 4, and

Figure 6 shows part of the pedal and the mounting therefor in perspective.

The floor-board of an automobile is designated at 1, and an accelerator-rod for an engine is represented at 2. My invention belongs to that class wherein a pedal is pivotally mounted, one end being adapted to engage upon and depress the accelerator-rod. The purpose, already intimated, is to provide a quick detachable arrangement between the pedal and a mounting for the same. This mounting is denoted at 3 and is preferably a metal stamping providing flexibility for certain of its parts, such parts being a pair of spaced ears 4 struck up at right angles to the plane of the base of such bracket or mounting as best shown in Figure 4, and one of such ears being shown in Figure 6. A portion of each ear at its free extremity 5 is outwardly bent to lie in a plane paralleling and spaced from the plane of the main body of such ear, this being particularly evident in said Figures 4 and 6, there being created a shoulder 5' between such extremity at 5 and said main body. Between the part 5 and the base of the mounting, or bracket, part of the metal is forced outwardly as at 6 forming a socket in the inner surface of the ear as shown in Figure 4. Also, between the socket so formed, and said base, a slit 7 is cut and the metal nearest the base is forced inwardly, as 8 in Figure 4. Further, the base of the mounting or bracket is provided with a pair of slots 9, 10, see Figure 5. The slot 9 lies in an oblique position with regard to the longest measurement of the base, while the slot 10 parallels that measurement. A screw or bolt 11 extends through each slot for securing the mounting to the floor-board 1, it being clear that the bracket by this peculiar slot arrangement may be shifted to any desired angle within limits.

The pedal for mounting on the bracket 3 is denoted in general by the character 12. This comprises a plate, preferably a stamping, and it has secured to it in suitable manner on its upper side a rubber foot-rest 13, the heel portions of both the plate and the foot-rest being upturned to provide an abutment for the heel of the driver's shoe. Near the heel-end of the plate, the metal is struck up to form two ears 14 so spaced from each other as to just snugly fit between the ears 4 of the base 3, Figure 4. Each ear near its base or root is outwardly bulged forming an abutment 15, and near each extremity, also, the metal is forced outwardly forming a protuberance 16 designed to fit the sockets on the inner faces of the ears 4 formed in the previously described portions 6 of the latter.

The bracket or mounting 3 having been mounted on the floor-board 1 in the position desired the pedal may now be mounted. Due to the fact that the ears 14 are designed to snugly fit between the ears 4 it is clear that as they are entered between the latter considerable pressure will be required to engage the ball-and-socket structure 6, 16. Upon engagement having been made the pedal is free to rock and cannot become disengaged from the mounting except by force. The pressure of the operator's foot will not be sufficient to separate the thus pivotally connected members. That disengagement cannot result in a downward direction under any circumstances the inwardly forced portion 8 of the ears 4 are provided, it being noted that these form abutments immediately below the ears 14 and under extreme pressure on the pedal the latter would be supported by such portions.

Attention is now directed to the relation of the ears 4 to the abutments 15. The pedal could, of course, be separated from the ears 4 by exerting a strong pull but in order that the act of separation may be quite easy the pedal may be tipped upwardly as indicated in broken lines in Figure 2 to carry the shoulders 5' against the abutments 15, this relation being shown in Figure 6. The abutments become the fulcrum for the ears 4 at the shoulders 5' and in a steady pull the portions 5 will ride upon said abutments thus spreading the ears 4, the pivotal connection being thus broken. In the normal pivotal action of the pedal the shoulders 5' and the abutments 15 do not approach each other, only the extreme tilting movement shown in Figure 2 bringing them into contact for the separating act.

The provision of such a type of arrangement as has been set forth herein obviates the use of separate connecting parts such as a pivot-bolt and nut ordinarily required, besides simplifying the attaching and detaching operation.

Naturally, since the means for fastening the bracket or mounting 3 to the floor-board is covered by the pedal the removal of the latter from the bracket is desirable in order to readily reach said means for providing for angular adjustment of the bracket to the end that the pedal may have the proper position for the foot of the driver. The ability to quickly attach and detach the pedal is, therefore, most desirable.

In certain of the claims the term "abutment" will be employed as meaning both the abutment 15 and the shoulder 5' in the interest of brevity.

In addition to the quick detachable feature there is shown on the under side of the pedal a tongue 17 which may preferably take the form of a spring. This is held at one end on the pedal near the heel-end thereof by a rivet 18, for example, the other end of said tongue adapted to engage beneath the button of the accelerator-rod 2, see Figure 1, and while of spring metal there may be sufficient stiffness to hold the pedal in permanent contact with said button or equivalent part, preventing rattling, while also preventing the pedal leaving the button by tilting backward on the bracket 3. The rivet while securing the tongue to the pedal may permit said tongue to have a slight lateral movement, the extent of such movement being limited by a stop 19 at each side of such tongue and slightly spaced therefrom, see Figure 3 particularly. This lateral play admits of the tongue conforming in position to the type or diameter of the rod 2, as well as compensating for any slight misalignment of the pedal with respect to the position of the starter-button, the stops 19, of course preventing the tongue swinging too far, or farther than necessary. The type of tongue is immaterial and the manner of fastening may be altered according to desire as long as the purpose sought is realized.

While specifically describing the parts entering into the pedal and bracket structure it is not the intent to be confined thereto since equivalents may be employed.

I claim:

1. In an automobile accelerator pedal, the combination of a bracket having a pair of ears extending therefrom, a pedal having a pair of ears, the ears of both the named parts having portions adapted to frictionally engage each other acting to pivotally connect the said parts but adapted for separation in a lateral direction, an abutment carried by one of the ears of each pair, one being disposed in the path of movement of the other, the same being disposed eccentrically to the place of pivotal connection of the ears adapted where brought together under strain to separate the ears of the pair and terminate such pivotal connection.

2. The combination with the accelerator device at the floor-board of an automobile, and a pedal for engaging upon the same, of a spring tongue attached to the pedal and engaging an under surface of the device adapted to hold the two in intimate engagement.

3. The combination with an automobile engine accelerator device having a head, and a pedal to bear upon the same, of a tongue attached to the pedal and engaging beneath said head and capable of having lateral movement with respect to said pedal, and means to limit said lateral movement of said tongue.

4. In a pedal structure for engaging and operating the accelerator of an automobile, the combination of a pair of spaced ears mounted in a fixed position and capable of being flexed, a pedal having near one end a pair of ears, one of the pairs of ears adapted to engage snugly between the ears of the other pair, the pairs of ears having complementary formations adapted to be held in engagement providing pivotal engagement of the pairs of ears but permitting separation of the said pairs by a lateral pull, and an abutment on corresponding ears of each pair adapted to engage one against the other in a movement of the pedal to an extreme position in its pivotal action, the abutments limiting the extent of tilting movement of the pedal, and in engaging each other constituting a fulcrum by which the separation of the complementary formations is effected.

5. In a pedal structure for operating the accelerator of an automobile engine, the combination of a support having a fixed position, a pair of spaced ears rigid therewith extending therefrom, a pedal having a pair of ears, one pair of the ears adapted to lie snugly within the other pair, the ears of one pair having an extension on one of its faces extending toward an ear of the other pair and nesting therein forming a pivot on which the pedal swings, an abutment on one of the ears of one pair, and an abutment on a corresponding ear of the other pair, the two abutments lying in spaced positions and spaced from the pivot of the ears, said pedal when swung to an extreme position carrying the abutments into engagement, the said abutments serving as fulcrums about which the pedal swings and serving to separate the pairs of ears from their pivotal positions.

6. The combination with two pairs of spaced ears and a separate mounting for each pair, one of the pairs of ears snugly enclosing the other pair and said pairs of ears having complementary portions forming pivots about which one pair may swing relatively to the other pair but separable in a lateral direction, of an abutment on one of the ears of one of the pairs spaced from the pivot portion thereof, and an abutment on a corresponding ear of the other pair, the same being also spaced from the pivot portion of that ear and adapted in the pivotal movement of the pairs of ears relatively to engage the first named abutment, the engagement of the two said abutments adapted under a pull in a direction transverse to the pivot axis to effect separation of the said pairs of ears.

7. In a pedal supporting structure, the combination of a pair of mounted spaced ears, a pedal having a pair of spaced ears adapted to lie between and to have snug engagement with the first named ears, the two pairs of ears having complementary portions adapted to engage in each other providing a pivotal connection capable of being separated laterally by force, the first named ears each having an abutment spaced from the axis of pivotal movement of the pairs of ears and lying in the same plane as the free extremities of the ears of the pedal, the said extremities adapted to engage the named abutments.

In testimony whereof I affix my signature.

HALE D. ADAMS.